United States Patent

Muller

[15] 3,659,693
[45] May 2, 1972

[54] LOADING DEVICE FOR PROCESSING MACHINES

[72] Inventor: Karl Muller, Theodorenstr. 6-8, 6200 Wiesbaden, Germany

[22] Filed: Nov. 3, 1969

[21] Appl. No.: 873,364

[30] Foreign Application Priority Data

Mar. 13, 1969 Germany.................P 19 12 659.1

[52] U.S. Cl. ...........................................................198/20
[51] Int. Cl. ................................................B65g 47/00
[58] Field of Search .................198/20; 53/251, 252, 59; 214/1 BB, 1 BC

[56] References Cited

UNITED STATES PATENTS

| 2,888,131 | 5/1959 | Allen | 214/1 BB |
| 3,198,308 | 8/1965 | Driesch | 198/24 |
| 3,362,519 | 1/1968 | Skarin | 198/24 |

*Primary Examiner*—Richard E. Aegerter
*Attorney*—Christen & Sabol

[57] ABSTRACT

A mechanism for feeding workpieces to a machine includes a conveyor system for moving workpiece receptacle to a machine at a constant speed and reciprocating loading means for transferring workpieces to the receptacles from a fixed station, the loading means being synchronized with the movement of the receptacles when moving in the direction to feed a workpiece.

8 Claims, 6 Drawing Figures

LOADING DEVICE FOR PROCESSING MACHINES

The invention deals with a loading device with a loading arm receiving workpieces and transferring them from a locally fixed receptacle for the workpieces to a processing machine operating continuously and with a continuous feed of the workpiece receiving station, which loading arm, during the transfer of the workpiece, moves in synchronism with the receptacles.

In the case of automation of processing procedures, the problem will occur of loading and unloading processing machines operating continuously and with a continuous feed of receptacles for the workpiece. In these cases, for example, with regard to broaching machines with long broaching tools, it will not be possible to stop the feed during the loading process because, as a result of that, one cannot maintain the precision of production of the workpiece being processed. Rather, the speed of feed must be maintained unchanged and each new workpiece must be inserted in the receiving space of the workpiece or be taken off from it. For that purpose, the loading arm, carrying out this transfer, must be in complete synchronism, during the transfer, with said receiving station of the workpiece and, at the same time, it can deviate very little from the transfer position. At the same time, a secondary condition often exists, namely that the movements must take place very rapidly since the speed of operation should be as high as possible. These problems of guiding the movement must be solved simultaneously if such devices are to operate faultlessly.

It is obvious to solve the problem by accomplishing position and synchronism of the loading arm and of the receptacle of the workpiece for the duration of the transfer of the workpiece by means of a controlled closure of the mold. Arrangements of this kind have also been known, but such arrangements in actual operation have serious defects. If irregularities occur during the transfer of the workpiece between the loading arm and the receiving station for the workpiece, then the intended transfer time can easily be executed and the loading arm can be driven against the stops limiting the path of movement of the loading arm. Thus the arrangement with its relatively high precision will be destroyed and, in most cases, considerable damage occurs, even to the processing machine.

Thus the task exists of establishing the synchronism between the loading arm and the receptacle for the workpiece in such a manner that mechanical damage or the destruction of the device be avoided in case of irregularities in the transfer of the workpiece.

According to the invention, the loading device will be designed in such a manner that the loading arm is provided with means guiding the workpiece in a controlled manner and that, during the transfer of the workpiece, it will be moved by a driving arrangement with a higher speed than the feeding speed and a smaller force than the feeding force of the workpiece receptacle, and in that the workpiece receptacle has a stop for the loading arm.

The advantage of the device consists in that the loading arm, after operation of the driving device, comes into positive connection with the workpiece receptacle with the result that synchronism exists. At the same time the course of movement of the feed of the workpiece receptacle is not disturbed, and the positive connection of the drive or of the workpiece in the guide means is not accomplished, whenever the transfer process has not been completely concluded at the time that the stops are reached by the loading arm. As a result of that, the device and the workpiece receptacle of the processing machine will remain undamaged whenever the stops of the loading arm have been reached since a positive connection between the loading arm and the workpiece receptacle through the workpiece itself can no longer occur anymore either.

It will be advantageous for the means guiding the workpiece in a positive connection to consist of gripping tongs that can be adjusted at various degrees of freedom by a gripping tong adjuster.

Through this development of the invention, a precise treatment of the workpiece has been made possible to carry out the transition.

It is a further object of the device according to the invention for the movement of the loading arm to be released by a sensor operated by the workpiece receptacle, which sensor will operate the drive of the loading arm whenever the stop of the workpiece receptacle happens to be in the direction of transportation, behind the loading arm.

Through this development of the invention, the length of time required for the transfer, in which synchronism must exist between the loading arm and the workpiece receptacle, can be shortened.

In a further development of the invention, the stop of the workpiece receptacle acts upon the loading arm whenever the loading arm moves toward the workpiece receptacle and it can be forced away by the loading arm whenever the workpiece receptacle moves toward the loading arm.

The advantage of this stop development consists in that the constructional dimensions can be decreased since the loading arm now can be in the path of movement of the stop of the workpiece receptacle even in its rest position.

A further advantageous development of the invention consists in that the operation of the drive of the gripping tong and of the gripping tong adjusters is accomplished hydraulically.

As a result of that, the positive connection can be accomplished with simple means in an optimum manner since the force of pressure of the loading arm against the stop of the workpiece receptacle and of the gripping tong against the workpiece can be adjusted through surplus pressure in the pressure line so that the pressure of the gripping tong as well as the acceleration of the loading arm to synchronize speed can be adjusted to the highest possible degree and the feed force acting on the workpiece receptacle can be adjusted to the smallest possible degree. Furthermore, the required rapid movement of all parts can be controlled well as a result of that and especially through the favorable damping characteristics of hydraulic drives at the beginning and at the end of movement.

It is particularly advantageous whenever the drive of the loading arm is accomplished by the piston of a linearly operating hydraulic cylinder.

Such cylinders, in contrast to rotating hydraulic motors, are simple constructional parts which will suffice for the short strokes of the loading arm.

A further particularly advantageous development of the drive will occur through the fact that the piston of the hydraulic cylinder is articulated to the crank pin of a loading arm executing a revolving movement.

As a result, that section of the crank movement of the acceleration phase of a loading arm executing the graduated dial movement can be selected in which the crank has the greatest possible mechanical advantage. Therefore, in this phase the greatest possible force of the hydraulic cylinder becomes effective, while for the rest of the movement of the graduated dial, the lesser force of the effectively foreshortening lever arm suffices.

In a further development of the invention, the drive is released through remote control.

As a result, the entire course of the movement of the loading and unloading can be regulated at an optimum in a simple manner.

Furthermore, it will be of advantage to combine various characteristics of the invention if a precise adaptation of a loading device to the pertinent purpose of use is to be achieved. Especially through the use of the adjustable gripping tong, not only is the loading of a processing machine possible, but also through a simple change of the sequence of functions of the device according to the invention, the unloading would also be possible.

A preferred embodiment of the invention has been shown schematically in the drawing by way of example.

Figure 1:
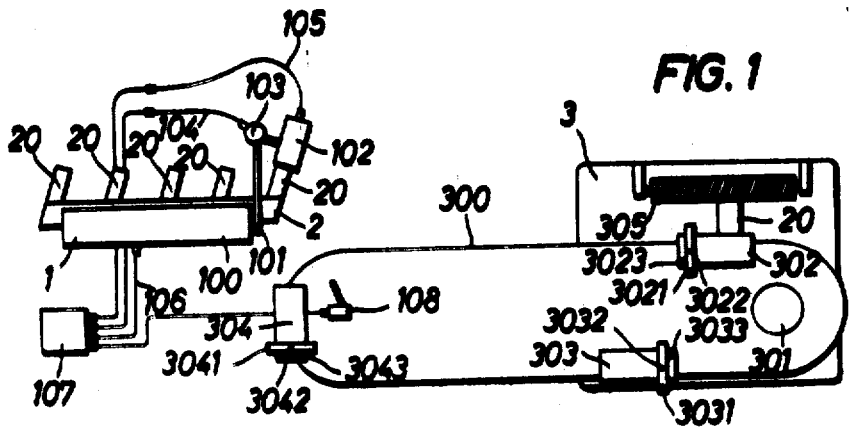
FIG. 1 illustrates a diagrammatic layout of a preferred form of loading device using with a processing machine in accordance with this invention.

In FIG. 1, numeral 1 indicates a loading device having an elongated station 2 for receiving workpieces 20 which are ready for processing. The loading devices includes an operating base 100 having a reciprocating loading arm 101, on the end of which there are gripping tongs 102 supported by a swivelling arm 103 attached to an upright support. The power for operating the tongs, the swivelling arm, loading arm and other devices is supplied by hydraulic lines 104, 105 and 106 connected with a source 107, under control of switching mechanism 108, all of the operations being performed by mechanisms which are well known in the art.

The processing machine 3, which may include a broaching machine 305 is provided with an endless conveyor means 300 which operates at constant speed and is provided with a series of workpiece receptacles 302, 303 and 304 for carrying a workpiece during the course of operation by the machine. Each of the receptacles is provided with a tripping arm, indicated by numerals 3021, 3031 and 3041, respectively pivotally attached to each receptacle at 3022, 3032 and 3042 so as to be movable in a counterclockwise direction but restrained against movement beyond the vertical in the other direction by the respective stops 3023, 3033 and 3043.

Figure 2:
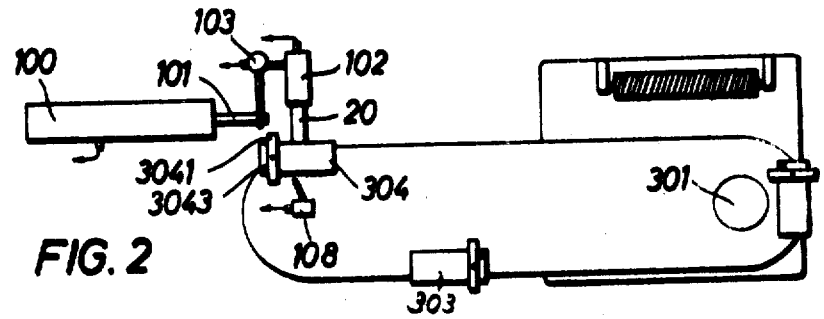
FIGS. 2 through 4 illustrate various cycles in the work transfer operation.
Figure 3:
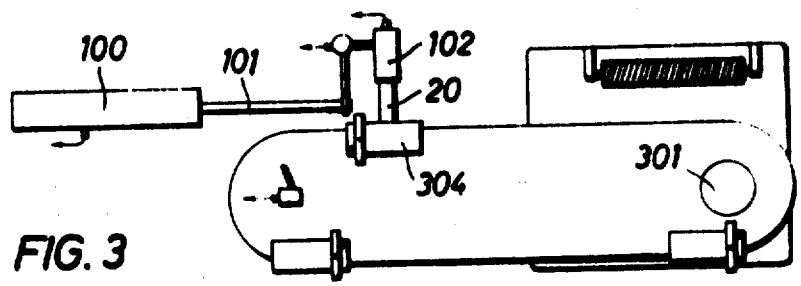
Figure 4:
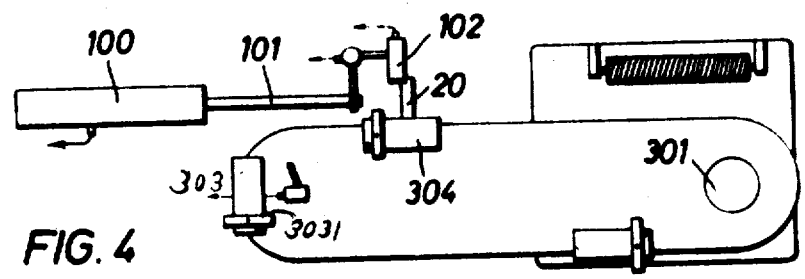

FIG. 2 shows the start of the transfer process which has been initiated by switching means 108 to cause the arm 101, carrying a workpiece gripped by tongs 102 to move toward the right, the rate of movement of the arm being arranged to be faster than the rate of movement of the conveyor so that the arm will overtake the receptacle 304 until it engages against the upper end of tripping arm 3041 which, because of stop 3043, will cause the arm 101 to slow to the same speed as the receptacle and move in synchronism with it because the force developed by the mechanism moving the arm is designed to be less than the resistance offered by the tripping arm. At the same time a sensing means (not shown) causes the gripping tongs 102 to correctly position the workpiece by manipulation of the swivelling arm 103 and to release the workpiece into the receptacle, which release has occurred in FIG. 3. In FIG. 4 the loading arm 101 has started retraction toward the left; since there is no positive connection between the loading arm and the receptacles, the workpieces 20 are merely carried along away from the gripping tongs. Furthermore, in case the loading arm has not been retracted before a succeeding receptacle 303 arrives, the tripping arm 3031 will pivot to allow the arm 101 to pass. Thus, no damage can occur.

Figure 5:
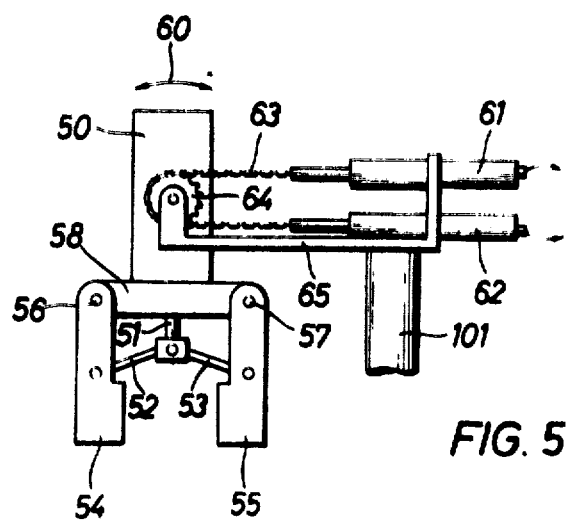
FIG. 5 is a fragmentary view of the gripping tongs as viewed from the right in FIGS. 1 - 4.

FIG. 5 shows a detail of the gripping tongs mechanism wherein numeral 50 indicates a hydraulic cylinder for the piston 51 which operates the clamping jaws 54 and 55, pivotally supported on yoke 58 by bearings 56 and 57 and connected with the piston by coupling members 52 and 53. The cylinder 50 is pivotally mounted on an offset frame 65 for tilting in directions shown by double arrow 60, the frame being offset from the vertical extension of the loading arm 101. A pair of hydraulic cylinders 61 and 62 include operating pistons connected with opposite ends of a chain 63 which engages with sprocket wheel 64 attached to cylinder 50. The hydraulic cylinders can be operated by differential pressure in a well known manner to avoid lost motion.

Figure 6:
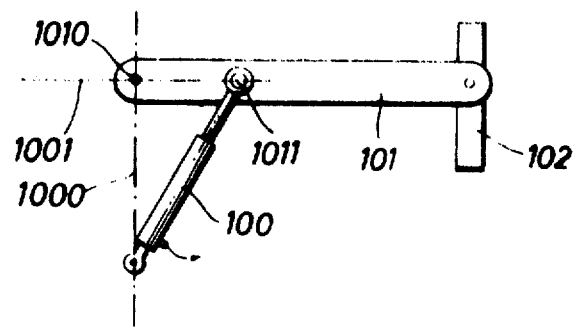
FIG. 6 is a fragmentary view of a mechanism for driving the loading arm.

FIG. 6 shows a detail of a mechanism for the graduated drive of the loading arm 101, which is shown in its rest position, pivotally connected to a support at 1010, with the hydraulic drive being a cylinder and piston 100, having one end supported at a point on the axis indicated by dotted line 1000, and connected at 1011 with the loading arm. Since the axis indicated by dotted line 1001 is at right angles to 1000 in the rest position, the acceleration of loading arm 101 will be at a maximum when the cylinder 100 initiates the stroke of arm 101.

I claim:

1. Loading mechanism for feeding workpieces from a fixed station to a succession of moving receptacles comprising conveyor means for moving a series of spaced workpiece engaging receptacles in a predetermined path in one direction at constant speed, loading arm means mounted for reciprocatory movement from and to a stationary location in a path parallel with said path of movement of said workpiece engaging receptacles, said loading arm means including workpiece gripping means for picking up a workpiece at said stationary station and depositing said workpiece in a moving one of said workpiece engaging receptacles, said loading arm means also including means for moving the gripping means from said stationary location and in the same direction as the workpiece engaging receptacles at a faster rate of speed than the speed of movement of said receptacles for overtaking a moving receptacle, said loading mechanism also including tripping means connected with each receptacle for synchronizing the rate of speed of movement of said gripping means with that of the receptacles when a workpiece engaging receptacle is overtaken to transfer the workpiece to the receptacle.

2. The invention defined in claim 1, wherein the loading arm means includes means for supporting the workpiece gripping means for movement about vertical and horizontal axes.

3. The invention defined in claim 1, wherein said means for synchronizing the rate of speed of the loading arm means includes sensing means responsive to approach of the gripping means to a receptacle.

4. The invention defined in claim 1, wherein said means for synchronizing the rate of speed of the gripping means includes a tripping arm means on a receptacle for engagement with the gripping means moving toward the receptacle, said arm means being retractable when the gripping means moves in a reverse direction relative to a receptacle.

5. The invention defined in claim 1, wherein said gripping means includes hydraulic actuating means for positioning the gripping means with respect to the loading arm means.

6. The invention defined in claim 5, wherein said gripping means is pivotally mounted for rotation about at least one axis, and a pair of linearly movable hydraullically operated members are connected with said gripping means for said movement.

7. The invention defined in claim 6, wherein said gripping means is also pivotally mounted for rotation about another axis, and a hydraullically operated member is connected with the gripping means for said rotation.

8. The invention defined in claim 1, wherein said movement of the loading means and said workpiece gripping means are provided with common remotely controlled actuating means.

* * * * *